United States Patent [19]

Batt

[11] 4,343,063
[45] Aug. 10, 1982

[54] WINDSHIELD WIPER ASSEMBLY

[75] Inventor: Richard A. Batt, Williamsville, N.Y.

[73] Assignee: Trico Products Corporation, Buffalo, N.Y.

[21] Appl. No.: 191,886

[22] Filed: Sep. 29, 1980

[51] Int. Cl.$^3$ .............................................. B60S 1/38
[52] U.S. Cl. .................................................. 15/250.42
[58] Field of Search ........................ 15/250.32–250.42

[56] References Cited

U.S. PATENT DOCUMENTS

| | | | |
|---|---|---|---|
| 2,767,419 | 10/1956 | Horton | 15/250.42 |
| 2,920,336 | 1/1960 | Anderson | 15/245 |
| 3,192,551 | 7/1965 | Appel | 15/250.36 |
| 3,473,186 | 10/1969 | Mainka | 15/250.36 |
| 4,090,272 | 5/1978 | Porter | 15/250.36 |

FOREIGN PATENT DOCUMENTS

| | | | |
|---|---|---|---|
| 3010403 | 9/1980 | Fed. Rep. of Germany | 15/250.42 |
| 2044603 | 10/1980 | United Kingdom | 15/250.42 |

Primary Examiner—Peter Feldman
Attorney, Agent, or Firm—E. Herbert Liss

[57] ABSTRACT

A windshield wiper refill wiping unit includes a squeegee element supported by a sinuous backing strip in which the central portion is convex in the direction facing the squeegee element and the end portions are concave on the side facing the squeegee element. The unit may be supported in an articulated superstructure having outboard claws which are disposed adjacent the end of the backing strip or in a superstructure having outboard claws which are spaced a substantial distance from the ends of the backing strip; it will produce improved pressure distribution in either type of superstructure.

9 Claims, 13 Drawing Figures

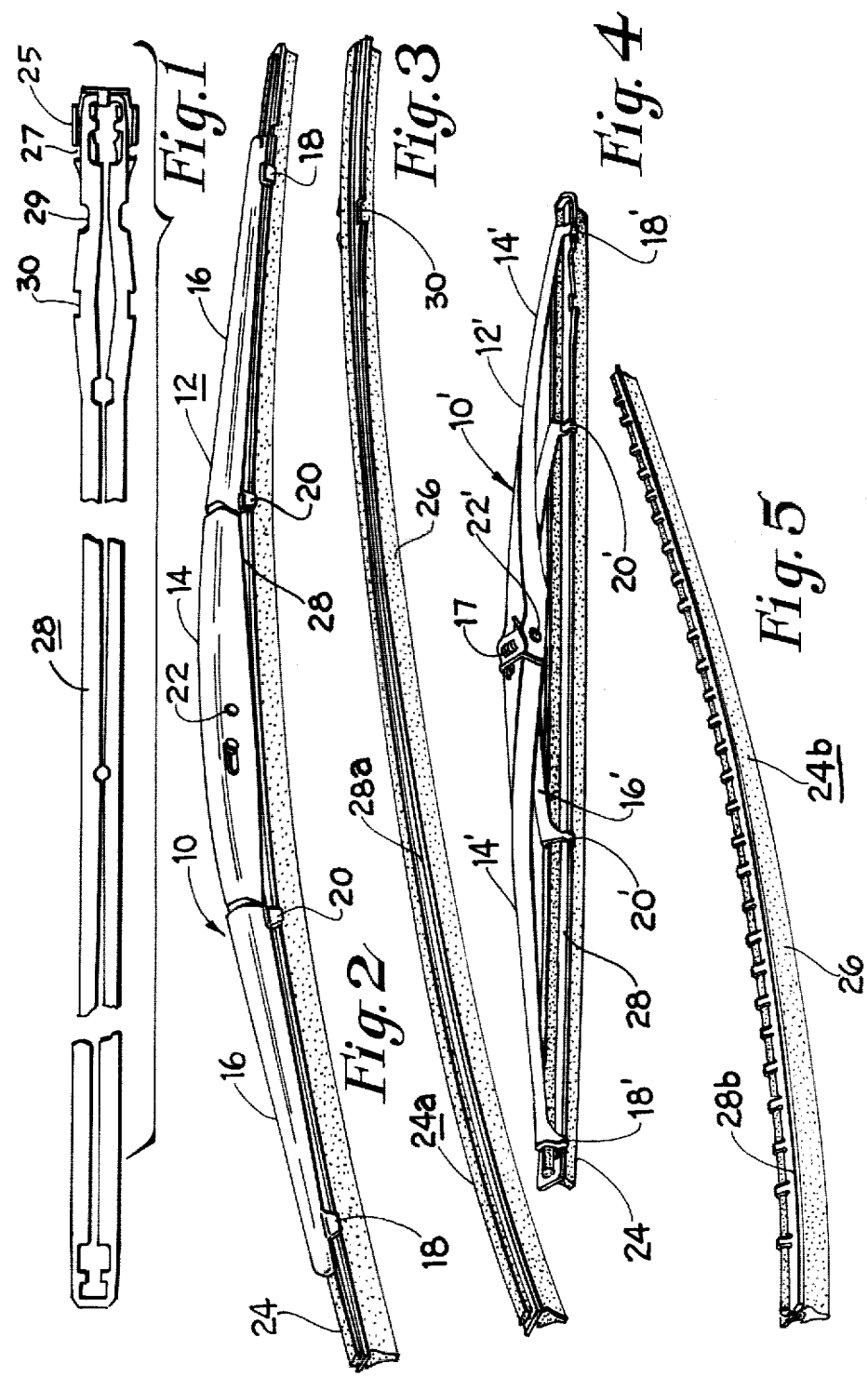

WINDSHIELD WIPER ASSEMBLY

BACKGROUND OF THE INVENTION

The present invention relates to windshield wipers and more particularly to an improved universal refill unit for windshield wipers.

Windshield wipers are generally supported at their central portion by a spring biased arm attached centrally to the superstructure which transmits the applied pressure through a plurality of longitudinally spaced opposed claws to a flexible backing member. The flexible backing member supports an elastomeric squeegee or wiping element and distributes the applied pressure over the entire length thereof. In conventional blades the pressure distribution pattern varies considerably over the length of the blade. Generally pressure is greatest in the area which is adjacent to the claws and decreases to a minimum value in zones which are located between successive pairs of claws. Lack of an appropriate pattern of pressure distribution can result in occurrence of streaks and unwiped areas on the windshield. Among the causes of these problems are failure of the blade to contact the windshield and also windlift from the windstream when pressure at certain points on the wiping element is inadequate. Excessive pressure is also undesirable in that it produces excessive wiper blade layover and consequent smearing. The ideal is to achieve uniform pressure distribution at an optimum pressure which will cause the edge of the lip to engage the windshield with sufficient force to avoid windlift but to avoid excessive layover and friction. Wiper blade assemblies and refill units have been proposed designed to compensate for variations in pressure distribution in a number of ways.

U.S. Pat. No. 3,473,186 to Mainka discloses a refill unit in which the rubber shoulder portion of a blade is decreased in width where the claws engage it to relieve the pressure at those points. It would tend to equalize the distribution of pressure; however such a design would only be applicable to a specific superstructure for which it is designed. The U.S. Pat. No. to Appel, 3,192,551, discloses a single leaf spring type superstructure varying in width from center to end to provide uniform pressure loading. This design relates to a complete blade; it is not intended to serve as a refill unit for conventional superstructures. The U.S. Pat. No. to Journee 3,969,784 discloses a superstructure with specially designed claws for equalizing the pressure distribution.

The refill unit comprising the backing element and the elastomeric squeegee element is an expendable unit which wears out with use. Generally it is removable from the original superstructure and replaceable. The drawbacks in the above-mentioned designs are their lack of universality. In each case either a complete new blade or a refill unit specifically designed for each particular superstructure would be required. For the sake of economy and availability it is desirable for a refill unit to be adaptable to various types of superstructures currently in use.

Certain types of wiper blade assemblies currently in use incorporate a full length superstructure in which the outboard claws engage the ends of the elongate refill unit adjacent the ends of the backing element. In that type of blade substantially greater pressure is transmitted to the ends of the blade than to the central portion which could result in streaking at the central portion and smearing at the ends. To compensate for the undesirable pressure distribution resulting from such a lever system the backing strip is formed with a longitudinal convex curvature on its side facing the squeegee element. Pressure is transferred from the ends to the central portion of the blade to thereby provide a pressure distribution pattern which avoids missed areas, streaking and smearing.

In certain other types of blade assemblies the outboard claws of the superstructure engage the backing strip at points spaced a substantial distance from the ends thereof. Thus, insufficient pressure may be transmitted to the ends of the squeegee element resulting in missed wiped areas at the ends. To compensate for this type of pressure distribution the backing elements are formed with a longitudinal concave curvature on the side facing the squeegee element hereinafter referred to as a negative bow, thereby increasing the pressure at the ends of the refill unit and relieving it somewhat in the central portion.

A compromise refill unit has been developed which is adaptable to both full length and short superstructures. This involves the incorporation of a backing strip convex on its surface facing the squeegee element but to a much lesser extent than the curvature of the backing strip designed for a full length superstructure. This produces a usable refill unit for both full length and short superstructures. Although adequate this compromise refill unit produces a less desirable pressure distribution pattern than the above mentioned units specifically designed for either full length or short superstructures.

SUMMARY

The novel refill unit of the instant invention incorporates a sinuous backing strip which in the center portion has a convex curvature in the direction facing the squeegee element, hereinafter referred to as a positive bow, and concave curvatures in the direction facing the squeegee element on the outboard portions of the backing strip, hereinafter referred to as a negative bow. Thus the advantages of both the positive bow for the full length superstructure and the negative bow for the short superstructure are achieved. Such a sinuous backing strip not only provides the universal aspect sought but also improves the pressure distribution pattern of both the short and the full length superstructures.

The principal object of the present invention is to provide an improved wiper assembly incorporating a universal refill element for diverse superstructures which effects improved pressure distribution.

Another object of the invention is to provide an improved refill unit usable with both full length and short superstructures which provides improved wiping quality by increasing the effectiveness of the pressure distribution in both types of superstructures.

Other objects and advantages of the invention will be apparent from the following detailed description taken in connection with the accompanying drawings.

BRIEF DESCRIPTION OF THE DRAWINGS

FIG. 1 is a top elevational view of a wiper blade backing element according to the invention;

FIG. 2 is a perspective view of the windshield wiper assembly incorporating a short superstructure;

FIG. 3 is a perspective view of a prior art refill unit used with a short superstructure;

FIG. 4 is a perspective view of a windshield wiper assembly incorporating a full length superstructure;

FIG. 5 is a perspective view of a prior art refill unit used with a full length superstructure;

DETAILED DESCRIPTION OF THE INVENTION

Figure 6:
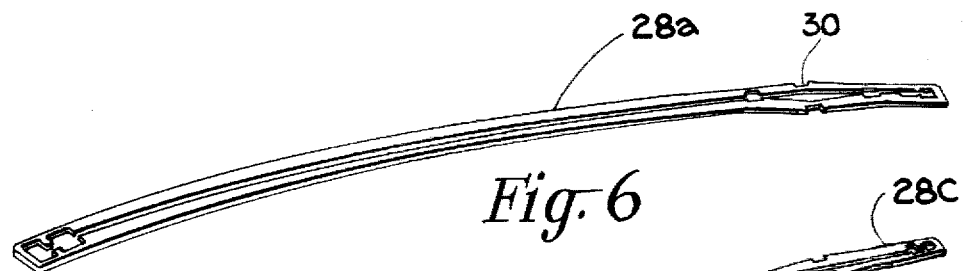
FIG. 6 is a perspective view of a prior art backing element for use with a refill unit in a short superstructure.

Referring now to the drawings, FIG. 2 illustrates a wiper blade 10 having an articulated short superstructure 12 comprising a central lever 14 and end levers 16 pivotally connected to the center lever end to end. First and second pairs of outboard claws 18 are provided adjacent the ends of the superstructure and additional pairs of opposed claws 20 are positioned inboard of the claws 18 on opposite sides of the lateral center line of superstructure 12. An aperture 22 is provided for securing the wiper blade to the arm. A refill unit 24 is slidably received and supported by pairs of claws 18 and 20. It comprises an elastomeric wiping element or squeegee unit 26 supported by an elongate backing element. The backing element 28 shown separately in FIG. 9 includes a notch 30 on each edge disposed in spaced relationship to the end thereof. The notches 30 resiliently engage the claw 18 of the short superstructure 12 to retain the refill unit 24 in assembly permitting limited longitudinal sliding movement with respect to the superstructure. In assembled condition the claws 18 are spaced substantially from the ends of the refill unit 24.

A wiper blade assembly 10' is illustrated in the embodiment shown in FIG. 4 which utilizes a full length superstructure 12'. In the example illustrated the superstructure 12' comprises a pair of spring biased levers 14' pivoted to each other at their inner end; a lever 16' is pivoted at its center to the axis of the levers 14'. A coil spring 17 biases the outer ends of the lever 14' in a direction toward the refill unit 24. First and second pairs of claws 20' are disposed at the ends of central lever 16'. An aperture 22' is provided for attaching the blade. It should be noted that in the full length superstructure of the FIG. 4 embodiment the outboard or first and second claws 18' are disposed closely adjacent the ends of the backing element 28. The refill unit 24 is secured to the superstructure by means of a bifurcated resilient end clip 25 more clearly seen in FIG. 1. The end clip 25 includes a notch 27 on each leg to engage a claw 18'. Notches 29 are provided between end clip 25 and notches 30 to facilitate assembly of the backing element 28 with the full length superstructure. The end of the backing element remote from the end clip 25 is passed through the pair of claws 20' and a pair of the claws 18' omitting the first pair of claws 18' until the first pair of claws 18' overlies notch 29 whereupon the first pair of claws 18' pass through the notches 29. The backing strip 28 is then backed through the first pair of claws 18' until the claws resiliently engage the notches 27 of the end clip 25. This feature avoids inadvertent engagement of the claws 18' in the notches 30 and facilitates universal use with either full length or short superstructures.

Figure 9:
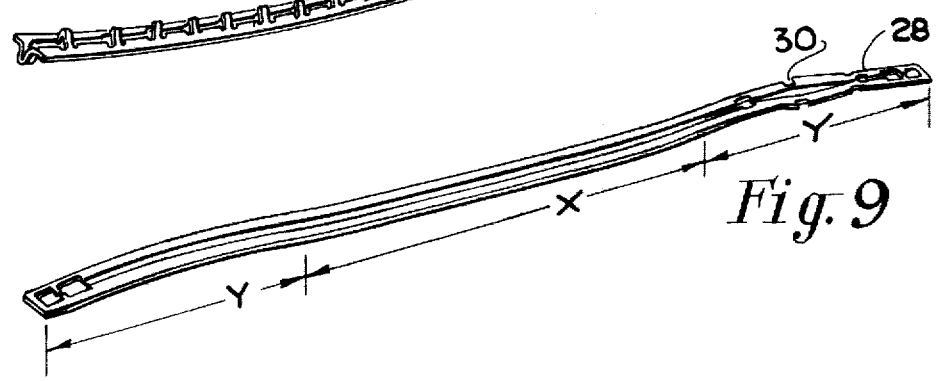
FIG. 9 is a perspective view of a backing element refill unit according to the present invention.
Figure 10:
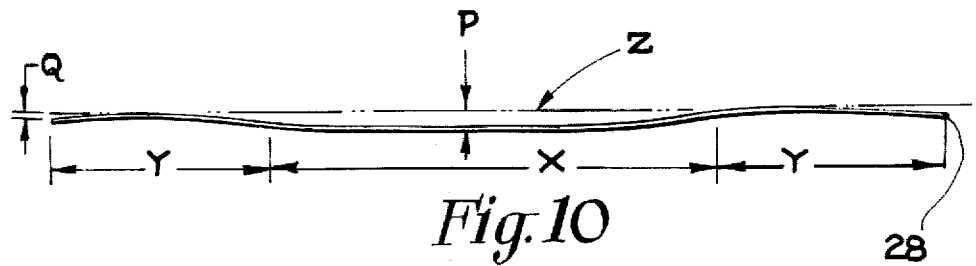
FIG. 10 is a side elevational view of the backing element illustrated in FIG. 9.

FIGS. 9 and 10 best illustrate the backing strip or backing element 28 of the present invention which is of sinuous non-angular configuration having a central zone X of convex curvature on the side facing the wiping element and end zones Y of concave curvature facing the wiping element. Zone X extends a distance equal to approximately half the length of the backing element 28. The end zones Y are of approximately equal length and extend from the ends of the central zone to the outer ends of the backing element 28. In accordance with the more specific aspects of the invention it has been found that the most effective equalization of pressure distribution is achieved when the central zone has a radius of between 125 and 255 inches and a maximum displacement at the lateral centerline P from a line Z tangent to the arcs formed by the end zones of curvature of between 0.02" and 0.06". The radius of the end zone Y should be between 170 inches and 525 inches and the displacement of the free ends of the backing strip from the tangent line Z should be between 0.04 inches and 0.06 inches.

Claws 18 or 18' and adjacent claws 20 and 20' define the outboard span of the superstructure. The pairs of claws 20 or 20' at each end of the central lever define a central span of the superstructure. When assembled, the central zone X of the backing strip underlies the central span of the superstructure and extends a relatively small distance into the outboard spans; the end zones Y underlie the outboard spans of the superstructure; in the short superstructure zones Y extend outwardly of the ends of the superstructure. Arm pressure is applied at connection 22 or 22' and transmitted through claws 18 and 20 or 18' and 20' to the backing element 28, whence it is distributed over the length of the refill unit 24.

Figure 7:
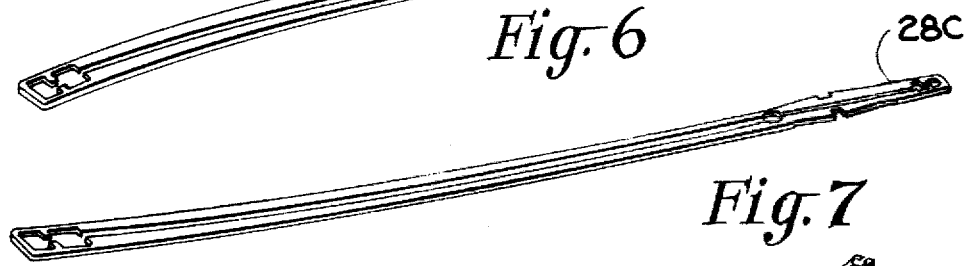
FIG. 7 is a perspective view of a prior art backing element usable with either a full length or short superstructure.
Figure 8:
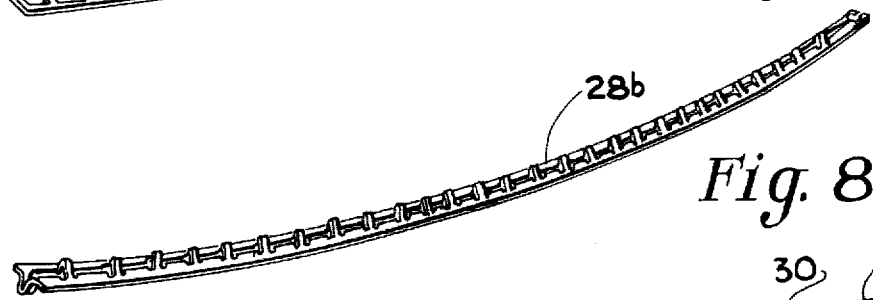
FIG. 8 is a perspective view of a prior art backing element for a refill unit used with a full length superstructure.

For purposes of comparison prior art refill units 24a and 24b are illustrated in FIGS. 3 and 5; prior art backing strips 28a, 28c and 28b are illustrated in FIGS. 6, 7 and 8 respectively. The refill unit 24a (FIG. 3) includes an elastomeric wiping element 26 supported by an elongate backing element 28a (FIG. 6) having a concave curvature on the side facing the wiping element 26; it is specifically designed for use with a short superstructure.

The refill unit 24b (FIG. 5) comprises an elastomeric wiping element 26 supported by a backing element 28(b) which is of convex curvature on the side facing the wiping element 26; this unit is specifically designed for use in full length superstructures.

The prior art backing element 28c (FIG. 7) is designed for universal use in either full length or short superstructures. This is convexly curved similar to the backing element 28b but on a substantially greater radius.

EXAMPLE I

Figure 11:
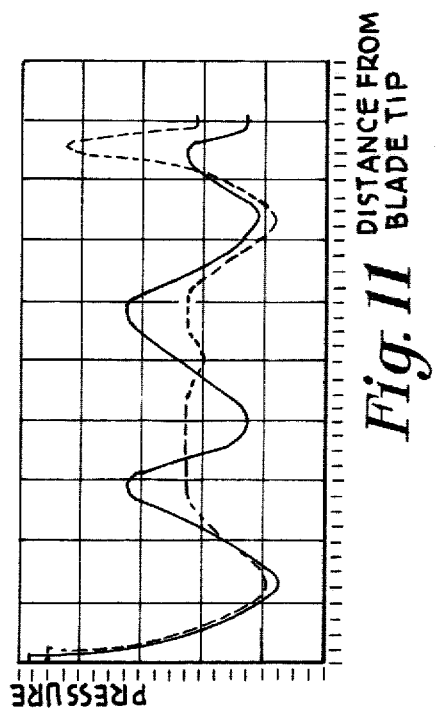
FIGS. 11 and 12 are pressure distribution curves of samples of full length and short superstructure blades respectively illustrating comparative pressure distribution patterns.

A full length superstructure of the type illustrated in FIG. 4 was fitted first with a refill unit employing the backing strip 28c illustrated in FIG. 7 and then the same superstructure was fitted with a sinuous backing strip according to the instant invention. FIG. 11 is a graphic comparison of the relative pressure distribution of the samples of this example along the length of the blade when applied to a windshield. The solid line shows the pressure distribution along the length of the blade when fitted with the prior art backing strip. The dotted line shows the pressure distribution when fitted with the refill of the instant invention. FIG. 11 illustrates a flattening or equalization of the pressure distribution across a major portion of the length of the blade; the peaks at the claws 20' have been substantially eliminated.

EXAMPLE II

Figure 12:
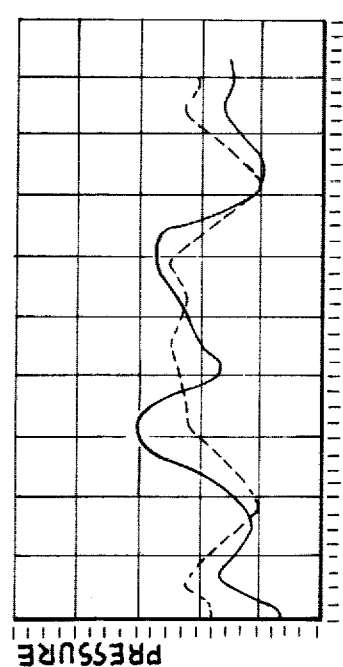

A short length superstructure of the type illustrated in FIG. 2 was fitted with a refill unit employing the backing strip 28c illustrated in FIG. 7 and then the same superstructure was fitted with a sinuous backing strip according to the present invention. FIG. 12 is a graphic comparison of the relative pressure distribution of the samples of this example along the length of the blade when applied to a windshield. The solid line represents the pressure distribution along the length of the blade when fitted with the prior art backing strip. The dotted line shows the pressure distribution when fitted with the refill of the instant invention. Considerable improvement in pressure distribution is apparent. The high peaks in the region of the inboard claws have been reduced and the valley in the central span has been substantially eliminated. Pressure at the unsupported ends has been increased to approximately the level of the central span.

The more uniform pressure distribution resulted in improvement in wipe quality; that is, less streaking and greatly reduced or eliminated unwiped areas at the blade tips.

EXAMPLE III

Twenty blades of each—the full length superstructure and the short superstructure—were fitted first with prior art refill units and then with refill units according to the present invention. The blades were operated on the windshield of a standard U.S. built automobile.

Figure 13:
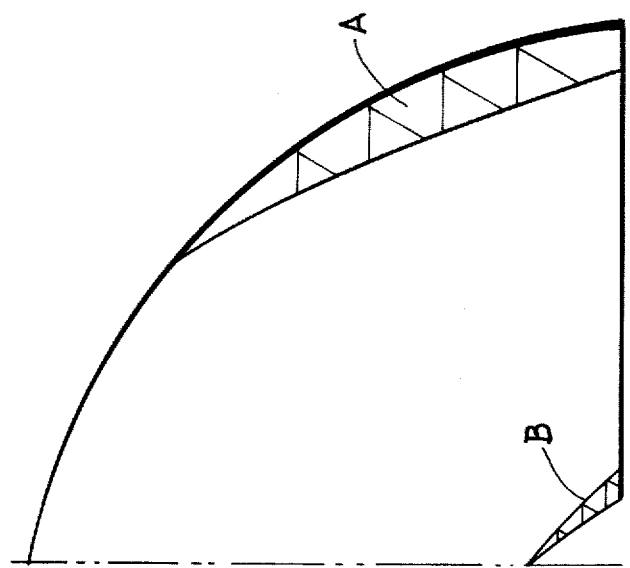
FIG. 13 is a wiping pattern illustrating missed wiping portions in an acceptable range.

On the basis of this test the unwiped area A (FIG. 13) left by the outboard tip of the blade at the maximum curvature of the windshield was eliminated entirely when the refill unit of the present invention was installed in the full length superstructure. The prior refill unit resulted in an area of about 7.5 in$^2$ of unwiped area at the outboard end. Neither the prior art refill unit nor the refill unit of the present invention produced any unwiped area B (FIG. 13) at the inboard tip.

On the basis of this same test utilizing short superstructures the average total unwiped areas was reduced 60 percent by substitution of the refill element of the present invention for the prior art refill unit. The reductions occurred at both areas A and B.

It should be noted that all of these results are within acceptable and satisfactory wiping standards. However, it can be seen that there is an extremely significant improvement in both pressure distribution and performance when the sinuous backing strip of the present invention is used.

It should now be apparent that a unique wiper assembly incorporating a refill unit with a novel backing element has been provided wherein improved distribution of applied pressure is achieved. The refill unit is adaptable to both full length and short superstructures and, in both, results in improved performance over prior universal refill units. Certain specific embodiments of the invention have been shown and described for the purpose of illustration but it will be apparent that in accordance with the broader aspects of the invention various modifications and other embodiments are possible within the scope of the invention. For example, for longer length blades additional undulations can be incorporated in the backing element. Other and different means of securing the refill unit in the superstructure may be employed and other and different types of superstructures may be used with the refill unit. It is to be understood, therefore, that the invention is not limited to the specific arrangements shown but in its broadest aspects it includes all equivalent embodiments and modifications which come within the scope of the invention.

I claim:

1. In a windshield wiper assembly including a refill unit comprising an elongate elastomeric wiping element supported by an elongate flexible backing member for distributing pressure applied at spaced points along its length over the length of the wiper blade and an articulated superstructure having a plurality of longitudinally spaced pairs of laterally opposed claws for supporting and transmitting applied pressure to said backing member; a refill unit characterized in that said backing member consists of a pair of elongate side rails connected together at the ends thereof and is of sinuous non-angular configuration in longitudinal section defining a central zone of convex curvature on the side facing the wiping element and end zones of concave curvature facing the wiping element extending from the ends of the central zone to the outer ends of the backing element, said end zones each having its free end displaced downwardly toward the wiping element.

2. In a windshield wiper according to claim 1, a refill unit characterized in that said central zone of curvature has a radius of between 125 and 255 inches.

3. In a windshield wiper assembly according to claim 1 a refill unit characterized in that the end zones of curvature have a radius of between 170 inches and 525 inches.

4. In a windshield wiper assembly according to claim 1, a refill unit characterized in that the ends of the backing member are displaced downwardly toward the wiping element a distance of between 0.02" and 0.06" from a line tangent to the arcs formed by the end zones of curvature.

5. In a windshield wiper assembly according to claim 1, a refill unit characterized in that the maximum displacement of the central zone from a line tangent to the arcs formed by the end zones of curvature is between 0.04 inches and 0.06 inches.

6. A windshield wiper assembly including a refill unit comprising an elongate elastomeric wiping element supported by an elongate flexible backing member for distributing pressure applied at spaced points along its length over the length of the blade and an articulated superstructure having a plurality of pairs of laterally opposed claws for transmitting applied pressure to said backing element, first and second of said pairs of claws adjacent each end of said superstructure and other of said pairs of claws positioned on opposite sides of the lateral centerline of said superstructure inboard of said first and second pairs of claws to thereby define a center span, an outboard span and an inboard span, characterized in that said backing member consists of a pair of elongate side rails connected together at the ends thereof and is of sinuous non-angular configuration in longitudinal section defining a central zone of convex curvature on the side facing the wiping element and end zones of concave curvature facing the wiping element, said central zone underlying said center span and each of said end zones underlying an inboard span and an outboard span, respectively, said end zones each having its free end displaced downwardly toward the wiping element.

7. A windshield wiper assembly according to claim 6 characterized in that said first and second pairs of claws are positioned substantially inwardly of the outer ends of the backing strip in assembled condition.

8. A windshield wiper assembly according to claim 6 characterized in that said first and second pairs of claws are positioned adjacent the ends of the backing element in assembled condition.

9. A windshield wiper assembly according to claim 6 characterized in that said central zone comprises substantially half the length of said backing element and each of said end zones comprise substantially one fourth the length of said backing element.

* * * * *